United States Patent
Ramael

(12) 
(10) Patent No.: US 6,433,031 B1
(45) Date of Patent: Aug. 13, 2002

(54) POLYMER-MODIFIED POLYOLS, THEIR USE FOR THE MANUFACTURE OF POLYURETHANE PRODUCTS

(75) Inventor: Dirk R L Ramael, Merksem (BE)

(73) Assignee: Huntsman International LLC, Salt Lake City, UT (US)

( * ) Notice: Subject to any disclaimer, the term of this patent is extended or adjusted under 35 U.S.C. 154(b) by 0 days.

(21) Appl. No.: 09/979,850

(22) PCT Filed: May 2, 2000

(86) PCT No.: PCT/EP00/03932

§ 371 (c)(1),
(2), (4) Date: Nov. 28, 2001

(87) PCT Pub. No.: WO00/73363

PCT Pub. Date: Dec. 7, 2000

(30) Foreign Application Priority Data

May 31, 1999 (EP) .............................................. 99110478

(51) Int. Cl.$^7$ ................................................. C08K 3/00
(52) U.S. Cl. ............. 521/137; 252/182.26; 252/182.27; 252/182.24; 521/134; 521/155; 521/170; 521/174
(58) Field of Search ................................. 521/134, 137, 521/155, 170, 174; 252/182.24, 182.26, 182.27

(56) References Cited

U.S. PATENT DOCUMENTS

| 4,374,209 | A | | 2/1983 | Rowlands |
| 4,438,252 | A | | 3/1984 | Carroll et al. |
| 5,416,123 | A | * | 5/1995 | Nishikawa et al. .......... 521/137 |
| 5,420,170 | A | * | 5/1995 | Lutter et al. ............ 252/182.24 |
| 5,668,378 | A | * | 9/1997 | Treboux et al. ......... 252/182.26 |
| 5,977,198 | A | * | 11/1999 | Hettel et al. ................. 521/174 |
| 6,143,802 | A | * | 11/2000 | Simroth et al. ............. 521/137 |
| 6,201,035 | B1 | * | 3/2001 | Tuinman et al. ............ 521/137 |

FOREIGN PATENT DOCUMENTS

| GB | 2102825 | 2/1983 |
| GB | 2163762 | 3/1986 |

* cited by examiner

Primary Examiner—John M. Cooney, Jr.
(74) Attorney, Agent, or Firm—Pillsbury Winthrop LLP

(57) ABSTRACT

The invention provides a high molecular weight polyol comprising dispersed therein the reaction of a polyisocyanate and low molecular weight polyol where said low molecular weight is a mixture of an alkanolamine with a polyethylene glycol having a molecular weight of less than 600. The invention also provides a method of making a polyurethane foam by reacting a polyisocyanate and a polyol using a blowing agent, where the polyol comprises the polyol of the invention. The invention also relates to the foam, especially the flexible foam, obtained by the process of the invention.

10 Claims, No Drawings

POLYMER-MODIFIED POLYOLS, THEIR USE FOR THE MANUFACTURE OF POLYURETHANE PRODUCTS

This application is the National Phase of International Application PCT/EP00/03932 filed May 2, 2000, which designated the U.S. and that International Application was published under PCT Article 21(2) in English. The PCT application is hereby incorporated in its entirety by reference.

The present invention relates to the field of polymer-modified polyols useful in the manufacture of polyurethane products.

Stable dispersions of particulate material in a high molecular weight polyol are known. These products are referred to as polymer-modified polyols or polymer polyols. One class of such polymer polyols is known as polyisocyanate polyaddition polyols (or PIPA polyols). They are the dispersion, in a high molecular weight polyol, of the reaction product of a polyisocyanate and a low molecular weight polyol.

GB-A-2 102 822 discloses such PIPA products, where the low molecular weight polyol is an alkanolamine, especially triethanolamine (TELA). While these products are adapted for the production of flexible foams, they suffer from drawbacks. The first drawback is the costs associated with TELA, which is an expensive product. The second drawback is the fact that the final product may not show sufficient load-bearing properties, since not all hydroxy groups of TELA may react with the isocyanate.

Similar problems occur with other alkanolamines, such as diethanolamine (DELA).

Diethyleneglycol (and other ethyleneglycol derivatives) is also known as a low molecular weight polyol used in preparing PIPA polyols, as is disclosed in EP-A-0 072 096. However, it suffers from drawbacks. The drawback is that DEG is to a higher extent soluble in high molecular weight polyol, providing solutions rather than dispersions. As a result, this often leads to solid PIPA products which remain solid despite heating.

It has been surprisingly found that flexible foams, having improved load-bearing properties, can be obtained from a polymer-modified polyol which is liquid (at room temperature) and where the low molecular weight polyol is a mixture of e.g. TELA or DELA with DEG.

Thus, the invention provides a polymer-modified polyol which is a high molecular weight polyol comprising dispersed therein the reaction product of a polyisocyanate and a low molecular weight polyol where said low molecular weight polyol is a mixture of an alkanolamine with a polyethylene glycol having a molecular weight of less than 600.

The invention also provides a process for making a flexible foam using the polymer-modified polyol of the invention, the thus-obtained foams, and a reaction system comprising the polymer-modified polyol.

In the context of the present invention the following terms, if and whenever they are used, have the following meaning 1) isocyanate index or NCO index:
   the ratio of NCO-groups over isocyanate-reactive hydrogen atoms present in a formulation, given as a percentage $$\frac{[NCO] \times 100}{[active\ hydrogen]}\ (\%)$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual foaming process involving the isocyanate ingredient and the isocyanate-reactive ingredients. Any isocyanate groups consumed in a preliminary step to produce modified polyisocyanates (including such isocyanate-derivatives referred to in the art as quasi or semi-prepolymers and prepolymers) or any active hydrogens reacted with isocyanate to produce modified polyols or polyamines, are not taken into account in the calculation of the isocyanate index. Only the free isocyanate groups and the free isocyanate-reactive hydrogens (including those of the water, if used) present at the actual foaming stage are taken into account.

2) The expression "isocyanate-reactive hydrogen atoms" as used herein for the purpose of calculating the isocyanate index refers to the total of hydroxyl and amine hydrogen atoms present in the reactive compositions in the form of polyols, polyamines and/or water; this means that for the purpose of calculating the isocyanate index at the actual foaming process one hydroxyl group is considered to comprise one reactive hydrogen, one primary or secondary amine group is considered to comprise one reactive hydrogen and one water molecule is considered to comprise two active hydrogens.

3) Reaction system: a combination of components wherein the polyisocyanate component is kept in a container separate from the isocyanate-reactive components.

4) The expression "polyurethane foam" as used herein generally refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-urethane foams).

5) The term "average nominal hydroxyl functionality" is used herein to indicate the average functionality (number of hydroxyl groups per molecule) of the polyol composition on the assumption that this is the average functionality (number of active hydrogen atoms per molecule) of the initiator(s) used in their preparation although in practice it will often be somewhat less because of some terminal unsaturation.

6) The term "average" is used to indicate an average by number.

By the term "polymer-modified polyol" is meant a polyol containing additional polymeric material dispersed in it. This term is understood by those skilled in the art and is used, for example, in EP-A-0 072 096.

The high molecular weight polyol used in the invention may be any of the polyols, or mixtures thereof, used in the manufacture of polyurethanes, having an average hydroxyl equivalent weight of at least 500. These polyols can be polyether polyols, polyester polyols, polyesteramide polyols, polythioether polyols, polycarbonate polyols, polyacetal polyols, polyolefin polyols, and the like.

Polyether polyols, which may be used, include products obtained by the polymerization of a cyclic oxide, for example ethylene oxide, propylene oxide, butylene oxide or tetrahydrofuran in the presence of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, toluene diamine, diethyl toluene diamine, phenyl diamine, toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, sorbitol and sucrose. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Random copolymers having oxyethylene contents of 10–90%, block copolymers having oxyethylene contents of up to 50% and random/block copolymers having oxyethylene contents of up to 90%, based on the total weight of oxyalkylene units may be mentioned in particular those having at least part of the oxyethylene groups at the end of the polymer chain. Mixtures of the said diols and triols can be particularly useful. Other particularly useful polyether polyols include polytetramethylene glycols obtained by the polymerization of tetrahydrofuran.

A preferred polyol is a poly(oxyethylene-oxypropylene) polyol having EO as tipped EO with an EO content from 5 to 30%, preferably 10 to 25%, on a weight basis of total oxyalkylene groups. One other preferred polyol is a poly(oxyethylene-oxypropylene) polyol having EO as random EO with an EO content from 2 to 40%, preferably 5 to 30%, on a weight basis of total oxyalkylene groups. One further preferred polyol is a poly(oxyethylene-oxypropylene) polyol having EO as random and tipped EO, where the random EO content is from 5 to 30%, preferably 5 to 20%, and the tipped EO content is from 5 to 30%, preferably 10 to 25%, on a weight basis of total oxyalkylene groups.

Polyester polyols which may be used include hydroxyl-terminated reaction products of polyhydric alcohols such as ethylene glycol, propylene glycol, diethylene glycol, 1,4-butanediol, neopentylglycol, 1,6-hexanediol, cyclohexane dimethanol, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polyesters obtained by the polymerization of lactones, for example caprolactone, in conjunction with a polyol, or of hydroxy carboxylic acids such as hydroxy caproic acid, may also be used.

Polyesteramide polyols may be obtained by the inclusion of aminoalcohols such as ethanolamine in polyesterification mixtures.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerizing cyclic acetals.

Suitable polyolefin polyols include hydroxy-terminated butadiene homo- and copolymers and suitable polysiloxane polyols include polydimethylsiloxane diols and triols.

The number average molecular weight of the high molecular weight polyol can vary within broad limits, e.g. from 1100–11200, preferably 1350–9350, most preferably 1680–8415; the average nominal functionality preferably is 2–6 and most preferably 2–4; the hydroxyl value preferably can vary within broad limits, e.g. from 15–150, preferably 18–125, most preferably 20–100 mg KOH/g.

Organic polyisocyanates may be selected from aliphatic, cycloaliphatic and araliphatic polyisocyanates, especially diisocyanates, like hexamethylene diisocyanate, isophorone diisocyanate, cyclohexane-1,4-diisocyanate, 4,4'-dicyclohexylmethane diisocyanate and m- and p-tetramethylxylylene diisocyanate, and in particular aromatic polyisocyanates like tolylene diisocyanates (TDI), phenylene diisocyanates and most preferably diphenylmethane diisocyanate optionally comprising homologues thereof having an isocyanate functionality of 3 or more (such diisocyanates comprising such homologues are known as crude MDI or polymeric MDI or mixtures of such crude or polymeric MDI with MDI) and modified variants thereof.

The diphenylmethane diisocyanate (MDI) used may be selected from 4,4'-MDI, 2,4'-MDI, isomeric mixtures of 4,4'-MDI and 2,4'-MDI and less than 10% by weight of 2,2'-MDI, and modified variants thereof containing carbodiimide, uretonimine, isocyanurate, urethane, allophanate, urea and/or biuret groups. Preferred are 4,4'-MDI, isomeric mixtures of 4,4'-MDI and 2,4'-MDI and less than 10% by weight of 2,2' MDI and uretonimine and/or carbodiimide modified MDI having an NCO content of at least 20% by weight and preferably at least 25% by weight and urethane modified MDI obtained by reacting excess MDI and polyol having a molecular weight of at most 1000 and having an NCO content of at least 20% by weight and preferably at least 25% by weight.

Diphenylmethane diisocyanate comprising homologues having an isoycanate functionality of 3 or more are so-called polymeric or crude MDI.

Polymeric or crude MDI are well known in the art. They are made by the phosgenation of a mixture of polyamines obtained by the acid condensation of aniline and formaldehyde.

The manufacture of both the polyamine mixtures and the polyisocyanate mixtures is well known. The condensation of aniline with formaldehyde in the presence of strong acids such as hydrochloric acid gives a reaction product containing diaminodiphenylmethane together with polymethylene polyphenylene polyamines of higher functionality, the precise composition depending in known manner inter alia on the aniline/formaldehyde ratio. The polyisocyanates are made by phosgenation of the polyamine mixtures and the various proportions of diamines, triamines and higher polyamines give rise to related proportions of diisocyanates, triisocyanates and higher polyisocyanates. The relative proportions of diisocyanate, triisocyanate and higher polyisoycanates in such crude or polymeric MDI compositions determine the average functionality of the compositions, that is the average number of isocyanate groups per molecule. By varying the proportions of starting materials, the average functionality of the polysiocyanate compositions can be varied from little more than 2 to 3 or even higher. In practice, however, the average isocyanate functionality preferably ranges from 2.3–2.8. The NCO value of such polymeric or crude MDI is at least 30% by weight. The polymeric or crude MDI contain diphenylmethane diisocyanate, the remainder being polymethylene polyphenylene polyisocyanates of functionality greater than two together with by-products formed in the manufacture of such polyisocyanates by phosgenation of polyamines. Further modified variants of such crude or polymeric MDI may be used as well comprising carbodiimide, uretonimine, isocyanurate, urethane, allophanate, urea and/or biuret groups; especially the aforementioned uretonimine and/or carbodiimide modified ones and the urethane modified ones are preferred. Mixtures of polyisocyanates may be used as well.

The low molecular weight polyol that will react with the isocyanate to form the dispersion is a mixture of alkanolamine and of a polyethylene glycol having a molecular weight of less than 600.

The alkanolamines are, for example, selected from the group consisting in monoethanolamine, diethanolamine, dimethylethanolamine, triethanolamine, N-methylethanolamine, N-ethylethanolamine, N-butylethanolamine, N-methyldiethanolamine, N-ethyldiethanolamine, N-butyldiethanolamine, monoisopropanolamine, diisopropanolamine, triisopropanolamine, N-methylisopropanolamine, N-ethyl isopropanolamine, N-propylisopropanolamine and mixtures thereof. Particularly useful alkanolamines are di- and tri-alkanolamines. DELA and TELA, especially TELA, are preferred.

The polyethyleneglycol (hereinafter identified as PEG) having a molecular weight less than 600 includes monoethyleneglycol (MEG), diethyleneglycol (DEG), triethyleneglycol (TEG), tetraethyleneglycol (TREG). DEG is preferred. The molecular weight is preferably less than 300. Unpurified oligomeric mixtures of these PEGs having a molecular weight up to 600 individually but an average molecular weight below 300 can also be used.

Each individual component (alkanolamine or PEG) can contain up to 25% of another low molecular weight alkanolamine or PEG. It can also contain up to 5% (calculated on low molecular weight polyol) of water.

Preferred mixtures are TELA/DEG and DELA/DEG, especially TELA/DEG.

Preferably, the amount of PEG in an alkanolamine mixture is such that the weight ratio alkanolamine:PEG is 10:90 to 70:30, most preferably 20:80 to 50:50.

The ratio of the alkanolamine to the polyethylene glycol is adjusted so that the final polymer-modified polyol is substantially liquid at 25° C. "Liquid" is intended to cover, notably, those polymer-modified polyols having a viscosity, measured at 25° C., of less than 40,000 cps, preferably less than 35,000 cps.

The method of manufacturing the polymer-modified polyol comprises the step of reacting a polyisocyanate in the presence of a high molecular weight polyol with a low molecular weight polyol which is a mixture of an alkanolamine and of polyethyleneglycol.

In carrying out the method of manufacturing, the polyisocyanate and the low molecular weight polyol are caused to react at isocyanate index of e.g. 40 to 100, preferably 45 to 95, most preferably 50–80.

The polymer-modified polyol comprises a dispersion of particles, where the particles have a size that may vary within broad limits. Preferably, the dispersed polymer particles will show a size of less than 50 microns, preferably below 10 microns. The particle size can be adjusted by selecting the mixing apparatus and process conditions.

The molecular weight of the poly-addition product may be varied by introducing monofunctionally reactive compounds to act as chain terminators, if needed. Such compounds include monofunctional isocyanates, and monohydric alcohols. They may usefully be used in amounts of up to 25 mol % of the low molecular weight polyol.

The reaction may be catalyzed by a catalyst of the type and in an amount conventionally used for the formation of polyurethanes, for example, an organometallic compound such as stannous octoate and dibutyl tin dilaurate or an amine such as triethylene diamine.

The concentration of the poly-addition product in the polymer-modified polyol may vary within limits but for most purposes the solids content will be between 10 and 80%, preferably from 30 to 72% and most preferably from 40 to 70% by weight based on the total weight of the polymer-modified polyol. It may prove advantageous to prepare the polymer-modified polyol at high solids content, say at 60%, and dilute it with more of a high molecular weight polyol to 5 to 45% before further use (this dilution polyol can be the same than the first high molecular weight polyol, or it may be different). In other instances, high solid content polymer-modified polyols will prove to be useful and will be used without any further dilution.

The respective amounts of the components will be adjusted so as to obtain the desired solids content in the polymer-modified polyol.

It will be recognized that in some polymer-modified polyols of the invention the poly-addition product may not be formed exclusively from the low molecular weight polyol but may incorporate units derived from the high molecular weight polyol. It is believed however that in most instances such units do not form more than a minor proportion of the total units in the poly-addition product and components are usually selected to achieve this situation e.g. the relative reactivity of the hydroxyl groups on the two polyols will be selected accordingly, i.e. the low molecular weight polyol is more reactive than the high molecular weight polyol.

The high molecular weight polyol used as starting material can itself already comprise dispersed particulate material (sometimes referred to as a seed). In such a case, a bimodal polymer polyol is obtained. This polyol already comprising dispersed material can be derived from the polymer-modified polyol of the invention which is diluted up to the desired concentration. These techniques are fully disclosed in EP-A-687279 (to Shell) and EP-A-418039 (to Dow), to which the skilled man may revert.

The choice of components for the polymer-modified polyol will be governed by the requirement to form a dispersion rather than a solution. As a first guide, the less soluble the low molecular weight polyol is in the high molecular weight polyol, the better. As a second guide, the reactivity of the low molecular weight polyol should be significantly higher compared to the high molecular weight polyol.

The polymer-modified polyol of the invention may be formed by a batch process in which either the low molecular weight polyol or the polyisocyanate (which latter is not preferred) is dissolved or dispersed in the high molecular weight polyol followed by the addition, with agitation, of the other. The dispersion will normally have a finer particle size if the reactants are mixed more efficiently. Alternatively, the polymer-modified polyol may be formed by a continuous in-line blending process. In this process the polyisocyanate and the two polyols are pumped at controlled rates and may be mixed simultaneously or either the low molecular weight polyol or the polyisocyanate may be mixed with the high molecular weight polyol followed by addition and mixing of the other.

Alternatively, the high molecular weight polyol, the alkanolamine and the polyethyleneglycol can be mixed in any order and then the isocyanate is added to the foregoing mixture. This latter embodiment is preferred.

Normally it will be sufficient to add the components at room temperature allowing the temperature to rise to up to 150° C. through the exothermic reaction and heat generated by high shear mixing, if used. The reaction is exothermic and, generally, the higher the concentration of the poly-addition product to be formed, the greater is the exotherm. Also, the greater the isocyanate index, the greater is the exotherm.

Catalysts and other additives may be used, if desired.

The polymer-modified polyols of the invention are useful in the manufacture of polyurethane products, especially polyurethane foams.

Polyurethane products are made by reacting a polyisocyanate with a polyol. The polymer-modified polyol of the invention may be used as the polyol component to produce, in particular, flexible polyurethane foam products. The nature of the foam will depend on the particular polyol chosen as the high molecular weight polyol in which the poly-addition product is dispersed, and also on the polyisocyanate and other ingredients conventionally used in the manufacture of polyurethane foams. They may be selected in known manner to produce the type of foam desired.

Polyisocyanates which may be used in making polyurethane products are comprehensively described hereinabove for the preparation of the polymer-modified polyol. The particular polyisocyanate used may be the same or different from that used to prepare the polymer-modified polyol.

The polymer-modified polyols of the invention are of particular value in making highly resilient flexible foams for cushioning and similar applications. These types of foam and their method of manufacture are well known in the polyurethane foam industry. Such foams made from the polymer-modified polyols of the invention have advantages in respect of increased hardness and less shrinkage properties. For foams of this type, the polymer-modified polyol is usefully prepared from polyoxyalkylene polyols, especially ethylene oxyde-tipped polyoxypropylene polyols, and reacted with pure, crude or modified MDI or TDI such as described hereinabove with respect to the polyisocyanates which may be used to prepare the polymer-modified polyol, or mixtures of MDI or a MDI prepolymer and mixtures of the foregoing with TDI.

The polymer-modified polyols of the invention may be used directly when they are made, or stored. If they are made by a continuous in-line blending process an intermediate storage vessel between the blending unit and polyurethane mixing head may be used, if necessary, to allow reaction between the polyisocyanate and low molecular weight polyol to be completed where this is slow. Polymer-modified polyol dispersions have good storage stability and can be stored before use.

A typical use level of particles in foam is between 1 and 30% by weight, based on total isocyanate reactive chemicals.

Other conventional ingredients may be used in making the polyurethane foams. These include catalysts, for example, tertiary amines and organic tin compounds, surfactants, cross linking or chain extending agents, for example, low molecular weight diols, triols and diamines, flame proofing agents, for example, halogenated alkyl phosphates, fillers and pigments. Blowing agents used for forming polyurethane foams include water, which reacts with the polyisocyanate to form carbon dioxide, and inert low boiling liquids or gaseous components such as carbon dioxide and nitrogen and such as halogenated hydrocarbons, examples of which are trichlorofluoromethane and dichlorodifluoromethane. Foam stabilizers, for example polysiloxane-polyalkylene oxide block copolymers, may be used to stabilize or regulate the cells of the foam.

The amount of these minor ingredients and blowing agents used will depend on the nature of the product required and may be varied within limits well known to a polyurethane foam technologist. In the case of highly resilient water blown flexible foams, it is appropriate to use from 1.0 to 20%, preferably from 1.5 to 10%, by weight of water based on the weight of the total polyol component, where the water can optionally be used in conjunction with carbon dioxide. An inert low boiling liquid may be used as an additional blowing agent, if it is desired to reduce the foam density.

In general, the composition of the foam-forming reaction mixture should be such that the ratio of isocyanate groups to active hydrogen atoms is such that the isocyanate index is comprised between 40 and 130, preferably between 60 and 110.

One shot, prepolymer or quasi-prepolymer methods may be employed as may be appropriate for the particular type of polyurethane being made.

The components of the polyurethane forming reaction mixture may be mixed together in any convenient manner. The individual components may be pre-blended so as to reduce the number of component streams requiring to be brought together in the final mixing step. It is often convenient to have a two-stream system whereby one stream comprises a polyisocyanate or prepolymer and the second stream comprises all the other components of the reaction mixture.

The invention is illustrated by the following Examples in which all parts and percentages are by weight unless otherwise indicated.

In all examples (for the making of PIPA polyols), the high molecular weight polyol is a glycerol initiated triol containing 15 wt % of ethylene oxide (as tipped), having an OH value of 28 mg KOH/g and an average hydroxyl equivalent weight of 2,000.

In the examples, the first polyisocyanate that is used is an uretonimine-modified MDI, Suprasec 2020 from Huntsman Polyurethanes, having a NCO value of 29,5%. The second polyisocyanate that is used is a pure MDI, Suprasec MPR from Huntsman Polyurethanes, having a NCO value of 33.6% and a melting point of about 40° C. (Suprasec is a trademark of Huntsman ICI Chemicals LLC).

The low molecular weight polyol is prepared in advance and added to the high molecular weigh polyol (the pot is poured into the other). Vigorous stirring is then carried out during 5 minutes. The isocyanate was then added, dropwise, over 15 minutes, under vigorous stirring. After completion of the isocyanate addition, stirring of the dispersion is continued for 15 additional minutes. Then the dispersion is allowed to cool down to room temperature.

The amounts of the components have been adjusted so as to obtain a final polymer-modified polyol dispersion having a 50 wt % content of solids.

The following table indicates the respective amounts (in parts by weight) for all examples: (the ratio is the ratio TELA/DEG or DELA/DEG).

| Ex. | polyol | DEG | TELA | DELA | ISO (type) | Ratio |
|---|---|---|---|---|---|---|
| 1 | 50 | — | 18.1 | — | 31.9 (1) | 100/0 |
| 2 | 50 | 9.3 | 9.3 | — | 31.4 (1) | 50/50 |
| 3 | 50 | 11.6 | 7 | — | 31.4 (1) | 38/62 |
| 4 | 50 | 10.3 | 8.2 | — | 31.5 (1) | 44/56 |
| 5 | 50 | 14.7 | — | 4.4 | 30.9 (2) | 23/77 |

The respective viscosities (expressed in cps, red at 25° C.) are as follows:

| Example | Viscosity |
|---|---|
| 1 | 15000 |
| 2 | 21000 |
| 3 | 21500 |
| 4 | 32400 |
| 5 | 27700 |

Foams have been manufactured starting from the above polymer-modified polyols: A polyol composition is prepared, comprising the following components: 82 parts of a polyol A, 18 parts of the PIPA polyols of examples 1–5 above, 2.7 parts of a polyol B, 0.27 part of Niax A1 (catalyst from Union Carbide), 0.54 part of D8154 (Amine catalyst from Air Products), 0.9 part of B4113 (surfactant from Goldschmidt), and 4.7 parts of water. Polyol A is the same as the high molecular weight polyol used above. Polyol B is a polyol having a functionality of 3, 76% by weight of EO as random, and a OH value of 42 KOH/g.

The polyisocyanate is a mixture of MDI (Suprasec 2565 available from Huntsman Polyurethanes and having a NCO content of 28.7%) and TDI, according to a weight ratio of 72.5/27.5.

The isocyanate index was 100, the weight ratio polyol composition to isocyanate being 100:65.2.

The polyol composition and the isocyanate are thermostated at 20° C. A foam is prepared by weighting 284.5 g of polyol composition and 185.5 g of isocyanate. This was mixed thoroughly for 10 seconds and was poured in a mould of 9.1 l which was thermostated at 60° C. After 5 minutes, the mould was opened and the foam was demoulded and crushed.

The results are summarized in the attached table.

| Properties | Ex. 1 | Ex. 2 | Ex. 3 | Ex. 4 | Ex. 5 |
|---|---|---|---|---|---|
| Moulding (ISO DIS 845) | | | | | |
| OD (kg/m3) | 41.5 | 41.7 | 41.2 | 41.5 | 41.5 |
| CD (kg/m3) | 37.7 | 39.7 | 38.7 | 39.1 | 39.8 |
| Compression hardness (ISO 3386-1) | | | | | |
| CLD 40% (kPa) | 4.2 | 5.1 | 5.2 | 5.1 | 5 |
| Hyst. Loss % | 17.1 | 18.1 | 18.3 | 18 | 18 |
| Indentation hardness (ISO 2439) | | | | | |
| ILD 40% (N) | 258 | 301 | 313 | 299 | 280 |
| Sag factor | 3.22 | 3.17 | 3.17 | 3.18 | 3.17 |
| Resilience (%) | | | | | |
| (Toyota) | 69 | 68 | 67 | 68 | 69 |
| Compression set (ISO 1856) | | | | | |
| Core dry 50% (%) | 4 | 5 | 4.3 | 3.9 | 5.1 |
| Core humid 50% (%) | 9.3 | 9.3 | 10 | 8.9 | 9.6 |
| Tensile strength (kPa) | 147 | 132 | 123 | 117 | 101 |
| Elongation (%) (ISO 1798) | 105 | 92 | 96 | 94 | 84 |
| Tear strength max. (N/m) (ISO 8067) | 303 | 231 | 247 | 286 | 241 |

What is claimed is:

1. A high molecular weight polyol comprising dispersed therein the reaction product of a polyisocyanate and a low molecular weight polyol where said low molecular weight polyol is a mixture of an alkanolamine with a polyethylene glycol having a molecular weight of less than 600.

2. The polyol of claim 1, where the weight ratio alkanolamine:polyethylene glycol is 10:90 to 70:30, preferably is 20:80 to 50:50.

3. The polyol of claim 1, where the molecular weight of the polyethylene glycol is less than 300 and wherein it is selected from the group consisting of monoethyleneglycol (MEG), diethyleneglycol (DEG), triethyleneglycol (TEG), and tetraethyleneglycol (TREG).

4. The polyol of claim 1, where the alkanolamine is TELA or DELA.

5. The polyol of claim 1, where the alkanolamine is TELA and the polyethylene glycol is diethyleneglycol (DEG), according to a weight ratio of 20:80 to 50:50.

6. The polyol of claim 1, where the solids content is between 10 and 80%, preferably from 30 to 72% and the most preferably from 40 to 70% by weight based on the total weight of said polyol.

7. The polyol of claim 1, where the polyisocyanate is MDI.

8. A method of making a polyurethane foam by reacting a polyisocyanate and a polyol using a blowing agent, where the polyol comprises the polyol claim 1.

9. The method of claim 8 of making a flexible polyurethane foam.

10. Foam obtained by the process of claim 8.

* * * * *